(12) United States Patent
Schroeder et al.

(10) Patent No.: US 6,318,907 B1
(45) Date of Patent: Nov. 20, 2001

(54) FIBER OPTIC CONNECTOR

(75) Inventors: Fred Georg Schroeder, Grosse Ile; John Pelino, Clinton Township; William Ince, Novi, all of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/677,820

(22) Filed: Sep. 29, 2000

Related U.S. Application Data

(63) Continuation-in-part of application No. 09/415,163, filed on Oct. 8, 1999, now Pat. No. 6,283,642.

(51) Int. Cl.⁷ .................................................. G02B 6/36
(52) U.S. Cl. .................. 385/88; 385/92; 385/78
(58) Field of Search ................... 385/90, 91, 92, 385/78, 88, 81, 84; 362/581

(56) References Cited

U.S. PATENT DOCUMENTS

| | | |
|---|---|---|
| 3,861,781 | 1/1975 | Hasegawa et al. . |
| 4,747,658 | 5/1988 | Borsuk et al. . |
| 4,759,600 | 7/1988 | Caron et al. . |
| 5,050,956 | 9/1991 | Carpenter et al. . |
| 5,094,494 * | 3/1992 | McConnell ............................ 285/318 |
| 5,321,784 | 6/1994 | Cubukciyan et al. . |
| 5,816,626 * | 10/1998 | Anderson .............................. 285/318 |

FOREIGN PATENT DOCUMENTS

| | | |
|---|---|---|
| 63-64007 | 3/1988 | (JP) . |
| 1-134406 | 5/1989 | (JP) . |
| 2-85808 | 3/1990 | (JP) . |

* cited by examiner

*Primary Examiner*—Darren Schuberg
*Assistant Examiner*—Leo Boutsikaris
(74) *Attorney, Agent, or Firm*—Larry I. Shelton

(57) ABSTRACT

A fiber optic connector for connecting a fiber optic light cable to a light source includes a light source housing for connection to a light source and a coupling for connection to a fiber optic light cable. The coupling includes a cage having a spring for locking the light source housing to the coupling to connect the fiber optic light cable to the light source housing, thereby allowing light from the light source to be efficiently coupled into the fiber optic light cable.

20 Claims, 4 Drawing Sheets

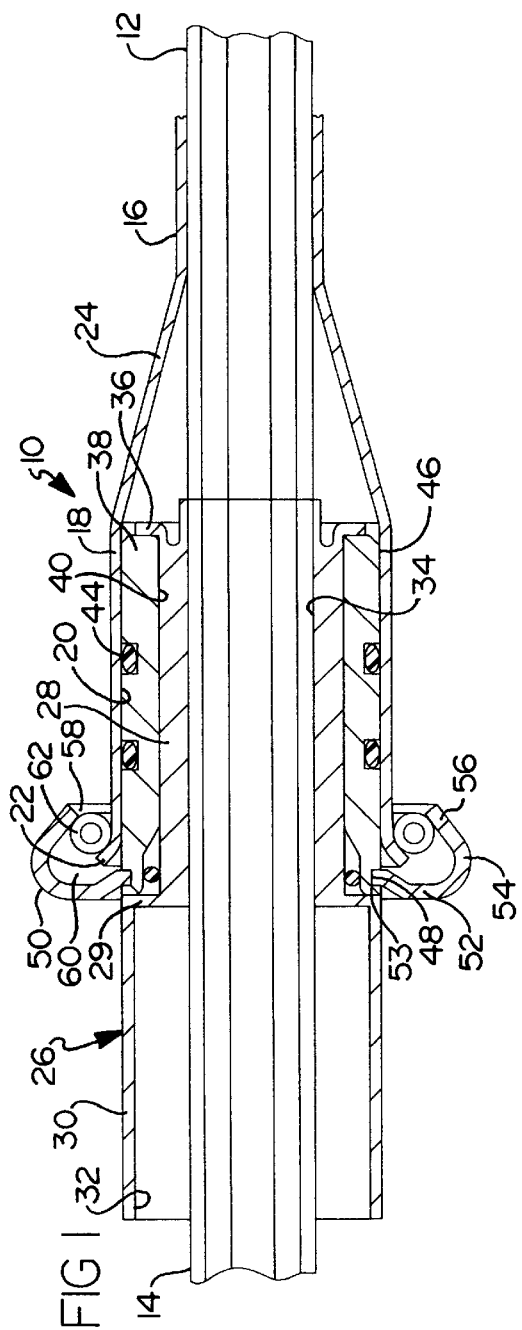

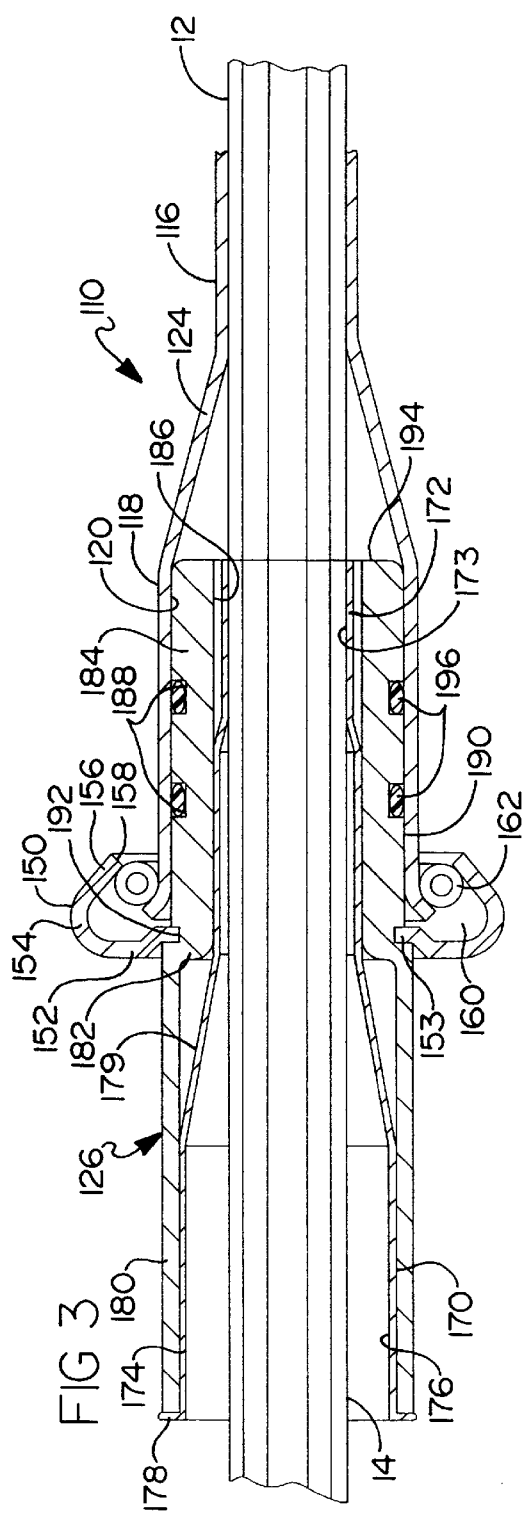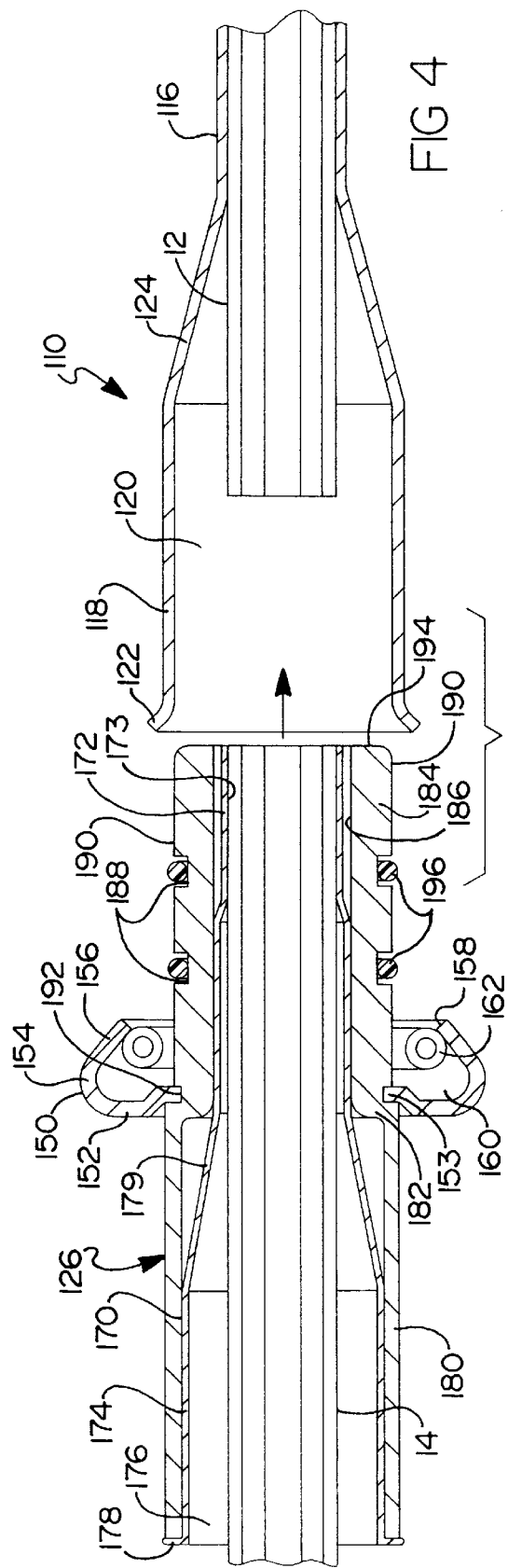

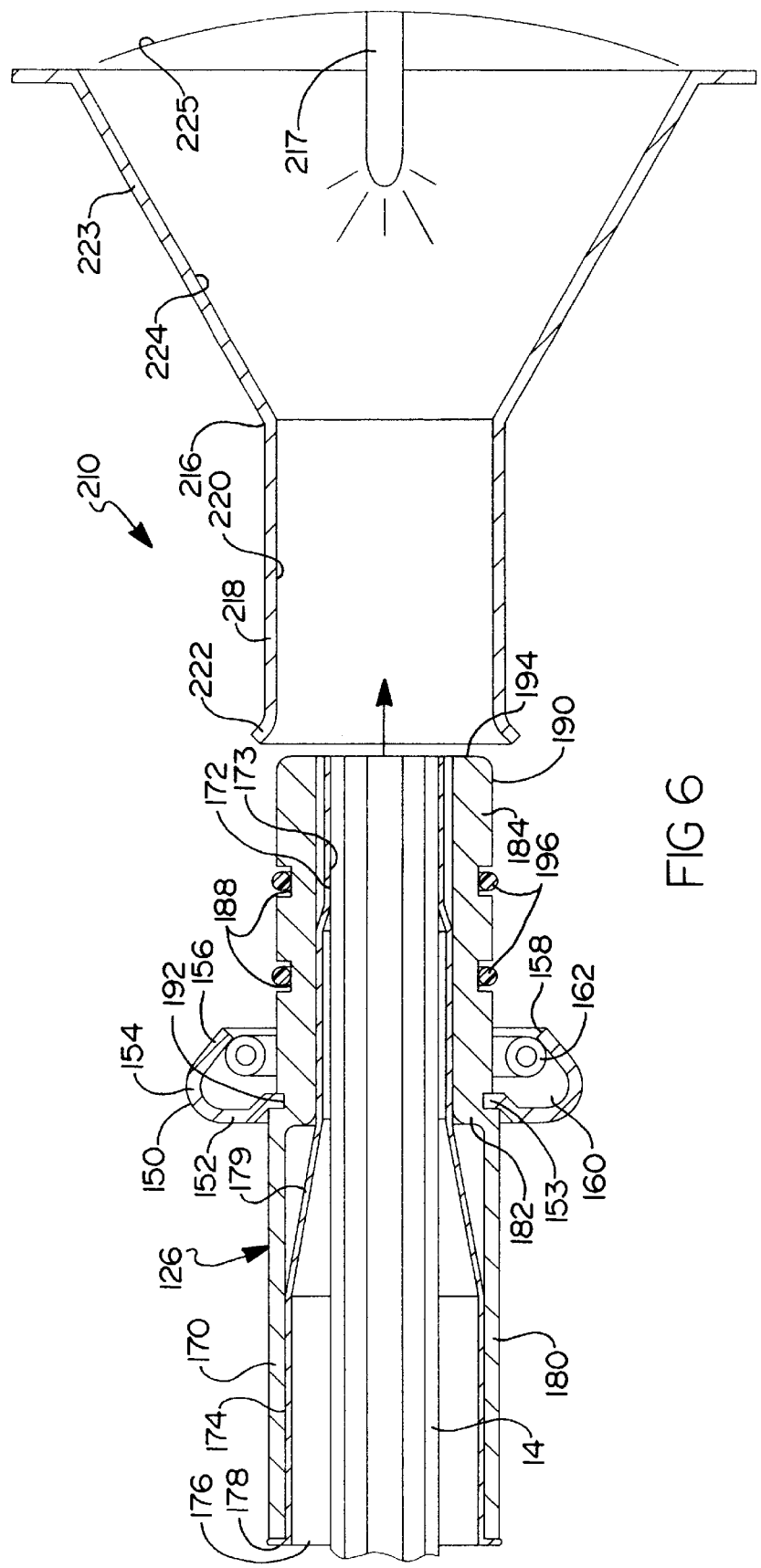

FIBER OPTIC CONNECTOR

CROSS-REFERENCE TO RELATED APPLICATION(S)

The present application is a Continuation-In-Part (CIP) of application Ser. No. 09/415,163 filed Oct. 8, 1999 now U.S. Pat. No. 6,283,642.

BACKGROUND OF THE INVENTION

1. Field of the Invention

The present invention relates generally to fiber optic light cables and, more specifically, to a connector for connecting a fiber optic light cable to a light source.

2. Description of the Related Art

It is known that fiber optic light cables are used for high-speed communication and data transmission and "piping" or carrying light from a light source. It is also known that these fiber optic light cables are typically connected with fiber optic connectors, which may be easily coupled and uncoupled. As used herein, the term "connector" means an article that allows connection, disconnection and reconnection of a fiber optic light cable to a light source, as opposed to a permanent connection between the cable and light source. As used herein, the term "light source" may be another fiber optic light cable or a light source such as an arc discharge lamp, laser, light emitting diode (LED), filament bulb, etc.

An example of such a fiber optic connector is disclosed in U.S. Pat. No. 5,321,784. In this patent, a fiber optic connector includes an extended ferrule collar and a surrounding body adapted to be received in one of several different connector shells. The ferrule collar and body form a subassembly that can be factory mounted to a fiber optic light cable.

Although the above fiber optic connector has worked, there is a need in the art to provide a fiber optic connector that retains the light cable from moving axially and laterally to ensure light transmission efficiency. In addition, there is a need in the art to provide a fiber optic connector that prevents environmental contaminants from entering therein while operating at high temperatures due to proximity to a light source.

SUMMARY OF THE INVENTION

Accordingly, the present invention is a fiber optic connector for connecting a fiber optic light cable to a light source. The fiber optic connector includes a light source housing for connection to a light source and a coupling for connection to a fiber optic light cable. The coupling includes a cage having a spring for locking the light source housing to the coupling to connect the fiber optic light cable to the light source housing, thereby allowing light from the light source to be efficiently coupled into the fiber optic light cable.

One feature of the present invention is that a fiber optic connector for connecting fiber optic light cables together into a single light source is provided. Another feature of the present invention is that the fiber optic connector retains the fiber optic light cable from moving axially and laterally to ensure light transmission efficiency. Yet another feature of the present invention is that the fiber optic connector also seals a joint to keep environmental contaminants out of the connector. Still another feature of the present invention is that the fiber optic connector uses two O-rings to minimize lateral movement as well as providing a seal. A further advantage of the present invention is that the fiber optic connector also permits the connection to be disconnected with a simple service tool.

Other features and advantages of the present invention will be readily appreciated, as the same becomes better understood, after reading the subsequent description when considered in connection with the accompanying drawings.

BRIEF DESCRIPTION OF THE DRAWINGS

FIG. 1 is a fragmentary elevational view of a fiber optic connector, according to the present invention, illustrated in operational relationship with fiber optic light cables.

FIG. 2 is an exploded fragmentary elevational view of the fiber optic connector and fiber optic light cables of FIG. 1.

FIG. 3 is a fragmentary elevational view of another embodiment, according to the present invention, of the fiber optic connector and fiber optic light cables of FIG. 1.

FIG. 4 is an exploded fragmentary elevational view of the fiber optic connector and fiber optic light cables of FIG. 3.

FIG. 6 is an exploded fragmentary elevational view of the fiber optic connector, fiber optic light cable, and light source of FIG. 5

DESCRIPTION OF THE PREFERRED EMBODIMENT(S)

Figure 5:
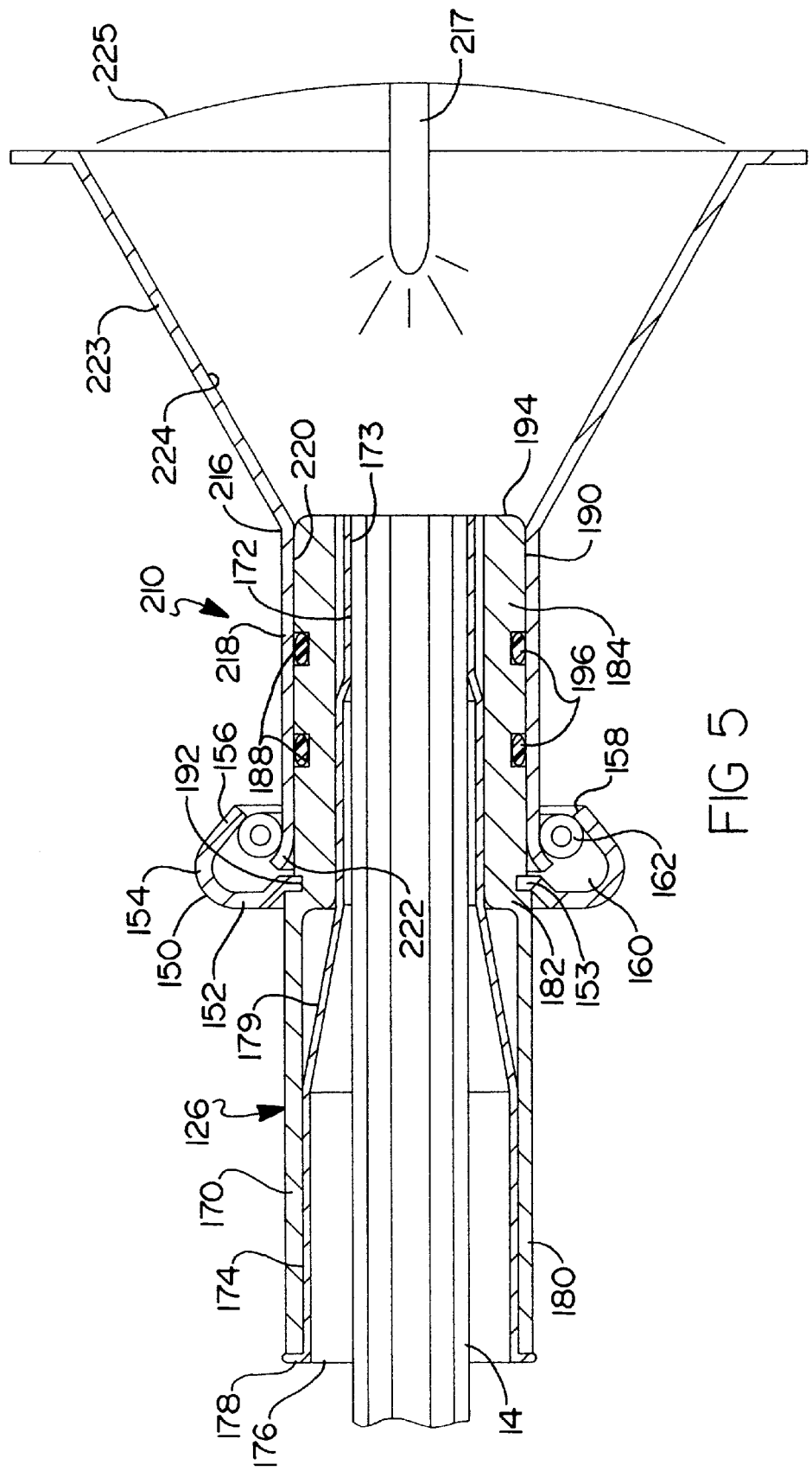
FIG. 5 is a fragmentary elevational view of yet another embodiment, according to the present invention, of the fiber optic connector and fiber optic light cables of FIG. 3.

Referring to the drawings and in particular FIG. 1, one embodiment of a fiber optic connector 10, according to the present invention, is illustrated in operational relationship with a light source such as a first fiber optic light cable 12 and a second fiber optic light cable 14. The fiber optic light cables 12 and 14 may be a single cable or a plurality of cables bundled together to form a single cable. The fiber optic light cables 12 and 14 are preferably made of glass fibers and may split into branches after leaving the fiber optic connector 10. It should be appreciated that, except for the fiber optic connector 10, the fiber optic light cables 12 and 14 are conventional and known in the art.

Referring to FIGS. 1 and 2, the fiber optic connector 10 includes a female fitting or light source housing 16 connected to one end of the first fiber optic light cable 12. The light source housing 16 has an end portion 18 that is generally cylindrical and slightly enlarged from a diameter of the light source housing 16 to form a cavity 20. The light source housing 16 also has a circumferential flange 22 at a terminal end of the end portion 18 for a function to be described. The light source housing 16 has a transition portion 24 extending between the end portion 18 and a remainder of the light source housing 16. The light source housing 16 is made of a rigid material such as metal. The light source housing 16 is secured to the first fiber optic light cable 12 by suitable means such as a press-fit. It should be appreciated that the light source housing 16 is a monolithic structure being integral, unitary and formed as one-piece.

The fiber optic connector 10 also includes a male fitting or coupling, generally indicated at 26, connected to one end of the second fiber optic light cable 14 and cooperating with the light source housing 16. The coupling 26 includes a ferrule 28 extending axially to a shoulder 29 extending radially. The ferrule 28 has an end portion 30 generally cylindrical and slightly enlarged from a diameter of the ferrule 28 and extending axially from the shoulder 29 to form a cavity 32. The ferrule 28 also has a passageway 34 extending axially therethrough and communicating with the cavity 32. The second fiber optic light cable 14 extends through the cavity 32 and passageway 34 and preferably terminates at the end of the passageway 34. The ferrule 28 also has a flange 36 extending radially outwardly near one end thereof for a function to be described. The ferrule 28 is made of a rigid material such as metal. The ferrule 28 is secured to the second fiber optic light cable 14 by suitable means such as a press-fit. It should be appreciated that the ferrule 28 is a monolithic structure being integral, unitary and formed as one-piece.

The coupling 26 also includes a spud 38 disposed about a portion of the ferrule 28. The spud 38 extends axially and is generally cylindrical in shape. The spud 38 has a passageway 40 extending axially therethrough. The passageway 40 has an enlarged opening 42 at one end thereof for a function to be described. The spud 38 also includes at least one, preferably a plurality of first grooves 44 in an outer surface 46 thereof. The first grooves 44 are annular and have a generally rectangular cross-sectional shape. The first grooves 44 are spaced axially for a function to be described. The spud 38 further includes a second groove 48 in the outer surface 46 at the end with the enlarged opening 42. The second groove 48 is annular and generally rectangular in cross-sectional shape for a function to be described. The spud 38 is made of a rigid material such as metal. The spud 38 is disposed about the ferrule 28 and mechanically locked or secured in place to the ferrule 28 between the shoulder 29 and flange 36 of the ferrule 28, providing a metal-to-metal environmental seal. It should be appreciated that the spud 38 is a monolithic structure being integral, unitary and formed as one-piece.

The coupling 26 includes a cage 50 connected to one end of the spud 38. The cage 50 has a base portion 52 extending radially and disposed in the second groove 48. The cage 50 is attached at the base portion 52 to the spud 38 by a crimped flange 53 on the spud 38 forming a portion of the second groove 48 to mechanically lock the cage 50 to the spud 38. It should be appreciated that other types of connection are also possible, such as welding, soldering, etc.

The cage 50 also has a curved wall portion 54 and a circular flange portion 56. The curved wall portion 54 is connected to the base portion 52. The circular flange portion 56 is connected to the curved wall portion 54 and is angularly inclined toward a terminal end 57 of the spud 38. The circular flange portion 56 ends at such a point that there is an access opening 58, which allows a portion of the light source housing 16 to be extended therein. The cage 50 defines an annular space 60 around the end of the spud 38. The curved wall portion 54 defines the largest diameter location of the annular space 60. The cage 50 also includes a spring 62 of a garter type located inside the annular space 60 and normally disposed on the outer surface 46 of the spud 38, which is capable of holding the light source housing 16 to the coupling 26.

The coupling 26 includes at least one, preferably a plurality of first seals 64 disposed in the first grooves 44. The first seals 64 are O-rings made of an elastomeric material. One first seal 64 is disposed in one first groove 44 for a function to be described.

The coupling 26 may include a second seal 66 disposed between the spud 38 and ferrule 28. The second seal 66 is an O-ring made of an elastomeric material. The second seal 66 is disposed about the ferrule 28 in the enlarged opening 42 of the passageway 40 between the ferrule 28 and spud 38 to act as an o-ring seal for enhanced environmental sealing. It should be appreciated that the second seal 66 is optional.

In operation of the fiber optic connector 10, the light source housing 16 is connected to the first fiber optic light cable 12. The coupling 26 is connected to the second fiber optic light cable 14 as illustrated in FIG. 2. The end portion 18 of the light source housing 16 is moved axially toward the spud 38 such that the spud 38 and ferrule 28 are disposed in the cavity 20. The end portion 18 is moved over the spud 38 to compress the first seals 64 and the flange 22 enters the access opening 58 in the cage 50. The flange 22 deflects the spring 62 radially and moves axially past the spring 62. The spring 62 returns radially and is disposed between the flange 22 and flange portion 56 to secure the end portion 18 in place on the spud 38 as illustrated in FIG. 1. The fiber optic connector 10 retains the fiber optic light cables 12 and 14 from moving axially to ensure light transmission efficiency. The fiber optic connector 10 also seals a joint between the coupling 26 and light source housing 16 with the first seals 64 to keep environmental contaminants out of the light source housing 16. The first seals 64 are used to minimize the lateral movement as well as providing a seal. A service tool (not shown) is used to disconnect the coupling 26 and light source housing 16. It should be appreciated that the service tool is conventional and known in the art. It should be appreciated that the fiber optic connector 10 serves as an attachment for connecting two fiber optic light cables 12 and 14 together.

Referring to FIGS. 3 and 4, another embodiment 110, according to the present invention, of the fiber optic connector 10 is shown. Like parts of the fiber optic connector 10 have like reference numerals increased by one hundred (100). In this embodiment, a fiber optic connector 110 includes a female fitting or light source housing 116 connected to one end of the first fiber optic light cable 12. The light source housing 116 has an end portion 118 that is generally cylindrical and slightly enlarged from a diameter of the light source housing 116 to form a cavity 120. The light source housing 116 also has a circumferential flange 122 at a terminal end of the end portion 118 for a function to be described. The light source housing 116 has a transition portion 124 extending between the end portion 118 and a remainder of the light source housing 116. The light source housing 116 is made of a rigid material such as metal. The light source housing 116 is secured to the first fiber optic light cable 12 by suitable means such as a press-fit. It should be appreciated that the light source housing 116 is a monolithic structure being integral, unitary and formed as one-piece.

The fiber optic connector 110 also includes a male fitting or coupling, generally indicated at 126, connected to one end of the second fiber optic light cable 14 and cooperating with the light source housing 116. The coupling 126 includes a ferrule 170 extending axially. The ferrule 170 has a first end portion 172 generally cylindrical and extending axially. The first end portion 172 has a passageway 173 extending axially therethrough. The first end portion 172 is connected to one end of the first fiber optic light cable 12. The ferrule 170 has a second end portion 174 that is generally cylindrical and enlarged from a diameter of the first end portion 172 to form a cavity 176. The second end portion 174 also has a flange 178 extending radially outwardly at a terminal end of the second end portion 174 for a function to be described. The ferrule 170 has a transition portion 179 extending between the second end portion 174 and the first end portion 172. The ferrule 170 is made of a rigid material such as metal. The ferrule 170 is secured to the second fiber optic light cable 14 by suitable means such as a press-fit. It should be appreciated that the ferrule 170 is a monolithic structure being integral, unitary and formed as one-piece.

The coupling 126 also includes a male connector 180 extending axially to a shoulder 182 extending radially. The connector 180 has a spud portion 184 extending axially from the shoulder 182 to be disposed about a portion of the ferrule 170. The spud portion 184 is generally cylindrical in shape. The spud portion 184 has a passageway 186 extending axially therethrough. The spud portion 184 also includes at least one, preferably a plurality of first grooves 188 in an outer surface 190 thereof. The first grooves 188 are annular and have a generally rectangular cross-sectional shape. The first grooves 188 are spaced axially for a function to be described. The spud portion 184 further includes a second groove 192 in the outer surface 190 at the end adjacent the shoulder 182. The second groove 192 is annular and generally rectangular in cross-sectional shape for a function to be described. The connector 180 is made of a rigid material such as metal, for example aluminum. The ferrule 170 is disposed inside the connector 180 and located axially by aligning the ferrule 170 flush with the end of the connector 180. The connector 180 is mechanically locked or secured in place to the ferrule 170 by suitable means such as crimping between the passageway 176 of the connector 180 and the second end portion 174 of the ferrule 170, providing a metal-to-metal environmental seal. It should be appreciated that the connector 180 is a monolithic structure being integral, unitary and formed as one-piece.

The coupling 126 includes a cage 150 connected to one end of the spud portion 184. The cage 150 has a base portion 152 extending radially and circumferentially. The cage 150 is attached at the base portion 152 to the spud portion 184 by a flange 153 on the base portion 152, which is disposed in the second groove 192 to mechanically lock the cage 150 to the spud portion 184. It should be appreciated that other types of connection are also possible, such as welding, soldering, etc.

The cage 150 also has a curved wall portion 154 and a circular flange portion 156. The curved wall portion 154 is connected to the base portion 152. The circular flange portion 156 is connected to the curved wall portion 154 and is angularly inclined toward a terminal end 194 of the spud portion 184. The circular flange portion 156 ends at such a point that there is an access opening 158, which allows a portion of the light source housing 116 to be extended therein. The cage 150 defines an annular space 160 around the end of the spud portion 184. The curved wall portion 154 defines the largest diameter location of the annular space 160. The cage 150 also includes a spring 162 of a garter type located inside the annular space 160 and normally disposed on the outer surface 190 of the spud portion 184, which is capable of holding the light source housing 116 to the coupling 126.

The coupling 26 includes at least one, preferably a plurality of seals 196 disposed in the first grooves 188. The seals 196 are O-rings made of an elastomeric material. One seal 196 is disposed in one first groove 188 for a function to be described.

In operation of the fiber optic connector 110, the light source housing 116 is connected to the first fiber optic light cable 12. The ferrule 170 is connected to the second fiber optic light cable 14 as illustrated in FIG. 4. The ferrule 170 is disposed in the passageway 186 of the connector 180 and moved axially until the flange 178 of the ferrule 170 abuts the end of the connector 180. The end portion 118 of the light source housing 116 is moved axially toward the spud portion 184 such that the spud portion 184 is disposed in the cavity 120. The end portion 118 is moved over the spud portion 184 to compress the seals 196 and the flange 122 enters the access opening 158 in the cage 150. The flange 122 deflects the spring 162 radially and moves axially past the spring 162. The spring 162 returns radially and is disposed between the flange 122 and flange portion 156 to secure the end portion 118 in place on the spud portion 184 as illustrated in FIG. 3. The fiber optic connector 110 retains the fiber optic light cables 12 and 14 from moving axially to ensure light transmission efficiency. The fiber optic connector 110 also seals a joint between the coupling 126 and light source housing 116 with the seals 196 to keep environmental contaminants out of the light source housing 116. The seals 196 are used to minimize the lateral movement as well as providing a seal. A service tool (not shown) is used to disconnect the coupling 126 and light source housing 116. It should be appreciated that the service tool is conventional and known in the art. It should be appreciated that the fiber optic connector 110 serves as an attachment for connecting two fiber optic light cables 12 and 14 together into a single light source.

Referring to FIGS. 5 and 6, yet another embodiment 210, according to the present invention, of the fiber optic connector 110 is shown. Like parts of the fiber optic connector 110 have like reference numerals increased by one hundred (100). In this embodiment, a fiber optic connector 210 includes a female fitting or light source housing 216 for connection to a light source 217 such as an arc discharge lamp, laser, light emitting diode (LED), filament bulb, etc. The light source housing 216 has an end portion 218 that is generally cylindrical and reduced from a diameter of the light source housing 216 to form a cavity 220. The light source housing 216 also has a circumferential flange 222 at a terminal end of the end portion 218 for a function to be described. The light source housing 216 has another end portion 223 that is generally cylindrical and conical in shape and having a cavity 224. The light source housing 216 is made of a rigid material such as metal. It should be appreciated that the light source housing 216 is a monolithic structure being integral, unitary and formed as one-piece. It should also be appreciated that the light source 217 transmits light directly or via a reflector into the cavity 224 of the end portion 223, which travels to the cavity 220 for transmission to the fiber optic light cable 14

The fiber optic connector 210 also includes a male fitting or coupling, generally indicated at 126, connected to one end of the fiber optic light cable 14 and cooperating with the light source housing 216. It should be appreciated that the fiber optic connector 210 may include the male coupling 26 instead of the coupling 126 for connection to the light source housing 216. It should also be appreciated that the operation of the fiber optic connector 210 is similar to the fiber optic connector 110.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A fiber optic connector for connecting a fiber optic light cable to a light source comprising:

a light source housing for connection to a light source;

a coupling for connection to a fiber optic light cable; and said coupling including a cage having a spring for locking said light source housing to said coupling to connect the fiber optic light cable to said light source housing, thereby allowing light from the light source to be efficiently coupled into the fiber optic light cable.

2. A fiber optic connector as set forth in claim 1 wherein said coupling includes a male connector extending axially and having an enlarged portion at one end.

3. A fiber optic connector as set forth in claim 2 wherein said male connector has a shoulder extending radially at one end of said enlarged portion.

4. A fiber optic connector as set forth in claim 3 wherein said male connector includes a spud portion extending axially from said shoulder and connected to said cage.

5. A fiber optic connector as set forth in claim 4 wherein said spud portion has a passageway extending axially therethrough.

6. A fiber optic connector as set forth in claim 4 wherein said spud portion has an outer surface with at least one annular groove therein.

7. A fiber optic connector as set forth in claim 6 wherein said coupling includes at least one seal disposed in said at least one annular groove.

8. A fiber optic connector as set forth in claim 2 wherein said coupling includes a ferrule connected to the fiber optic light cable and disposed in said connector.

9. A fiber optic connector as set forth in claim 8 wherein said ferrule has a first end portion extending axially with a passageway extending axially therethrough for receiving the fiber optic light cable, an enlarged second end portion spaced axially from said first end portion, and a transition portion extending axially and radially between said first end portion and said second end portion.

10. A fiber optic connector as set forth in claim 9 wherein said ferrule has a flange extending radially at a terminal end of said second end portion to abut an end of said male connector.

11. A fiber optic connector as set forth in claim 1 wherein said cage comprises a base portion extending radially, a curved wall portion connected to said base portion and a circular flange portion connected to said curved wall portion to form an annular space.

12. A fiber optic connector as set forth in claim 11 wherein said cage includes an opening in said flange portion, said spring being disposed in said space adjacent said opening.

13. A fiber optic connector as set forth in claim 11 wherein said spring is a garter spring.

14. A fiber optic connector as set forth in claim 11 wherein said light source housing has an end portion and a circumferential flange extending from said end portion and engaged by said spring.

15. A fiber optic connector as set forth in claim 2 wherein said male connector is made of a metal material.

16. A fiber optic connector as set forth in claim 8 wherein said ferrule is made of a metal material.

17. A fiber optic connector for connecting a fiber optic light cable to a light source comprising:

a light source housing for connection to a light source;

a coupling for connection to a fiber optic light cable; and said coupling including a male connector extending axially and having a spud portion with a first passageway extending therethrough, a ferrule disposed in said first passageway and having a second passageway for receiving the fiber optic light cable, and a cage connected to said spud portion and having a spring for locking said light source housing to said coupling to connect the fiber optic light cable to the light source housing, thereby allowing light from the light source to be efficiently coupled into the fiber optic light cable.

18. A fiber optic connector as set forth in claim 17 wherein said ferrule has a first end portion extending axially with a passageway extending axially therethrough for receiving the fiber optic light cable, an enlarged second end portion spaced axially from said first end portion, a flange extending radially at a terminal end of said second end portion to abut an end of said male connector, and a transition portion extending axially and radially between said first end portion and said second end portion.

19. A fiber optic connector as set forth in claim 17 wherein said spud portion has an outer surface with at least one annular groove therein and at least one seal disposed in said at least one annular groove.

20. A fiber optic assembly comprising:

a fiber optic light cable;

a light source;

a light source housing;

a coupling connected to said fiber optic light cable;

said coupling including a cage having a spring for locking said light source housing to said coupling to connect said fiber optic light cable and said light source together, thereby allowing light from said light source to be efficiently coupled into said fiber optic light cable.

* * * * *